United States Patent [19]
Modahl

[11] Patent Number: 5,426,955
[45] Date of Patent: Jun. 27, 1995

[54] ABSORPTION REFRIGERATION SYSTEM WITH ADDITIVE SEPARATION METHOD

[75] Inventor: Robert J. Modahl, Galesville, Wis.

[73] Assignee: Gas Research Institute, Chicago, Ill.

[21] Appl. No.: 131,906

[22] Filed: Oct. 5, 1993

[51] Int. Cl.⁶ ............................................. F25B 15/00
[52] U.S. Cl. .......................................... 62/497; 62/103
[58] Field of Search ................. 62/101, 103, 104, 476, 62/489, 497

[56] References Cited

U.S. PATENT DOCUMENTS

| | | | |
|---|---|---|---|
| 3,276,217 | 10/1966 | Bourne et al. | 62/101 |
| 3,293,873 | 12/1966 | Bourne et al. | 62/489 |
| 3,783,631 | 1/1974 | Modahl et al. | 62/112 |
| 3,977,204 | 8/1976 | Bourne | 62/85 |
| 3,977,211 | 8/1976 | Bourne | 62/476 |
| 4,440,001 | 4/1984 | Vardi et al. | 62/475 |
| 4,485,638 | 12/1984 | Reimann | 62/476 |
| 4,504,396 | 3/1985 | Vardi et al. | 210/800 |
| 4,841,744 | 6/1989 | Kurosawa et al. | 62/475 |
| 5,018,368 | 5/1991 | Steidl et al. | 62/480 |
| 5,081,851 | 1/1992 | Murray | 62/475 |
| 5,127,234 | 7/1992 | Woods, Jr. | 62/101 |
| 5,237,839 | 8/1993 | Dehne | 62/476 |

*Primary Examiner*—Henry A. Bennet
*Assistant Examiner*—William C. Doerrler
*Attorney, Agent, or Firm*—McAndrews, Held & Malloy, Ltd.

[57] ABSTRACT

An absorption refrigeration system which has a method for separation an absorption enhancing additive from a composite refrigeration fluid. The system has a separator interposed in sites between an absorber and a generator to distill an additive from a composite refrigeration fluid. After the separator a composite refrigerant passes through a generator, a condenser and an evaporator before being passed to an absorber. The additive distillate is passed directly to the absorber from the separator bypassing the more volatile components of the system. The additive contacts the refrigerant fluid in the absorber thereby improving the absorption rate.

14 Claims, 7 Drawing Sheets

ABSORPTION REFRIGERATION SYSTEM WITH ADDITIVE SEPARATION METHOD

FIELD OF THE INVENTION

This invention relates generally to absorption refrigeration apparatus, and particularly to such apparatus including one or more volatile absorption additives in the refrigerant.

BACKGROUND OF THE INVENTION

Absorption refrigeration and related apparatus employing a composite refrigerant fluid and a refrigeration loop is well known. The refrigeration loop includes a generator, a condenser, an evaporator, and an absorber. A variety of composite refrigerant fluids can be used in such apparatus. Two examples are an ammonia/water system and a lithium bromide/water system.

Heat from a source of energy outside the refrigeration loop is added to the composite refrigerant in the generator. The generator heats the composite liquid refrigerant sufficiently to distill out a vapor of the more volatile component or phase of the refrigerant (for example, ammonia vapor in the case of the ammonia/water refrigerant and water in the case of the lithium bromide/water system), leaving a less-volatile component or phase of the refrigerant behind. The less-volatile refrigerant component can either be more concentrated than the composite refrigerant (as when water vapor is distilled out of an aqueous lithium bromide solution) or more dilute than the initial refrigerant (as when ammonia is driven out of water solution). The remaining less-volatile refrigerant component is removed to the absorber.

The condenser receives the vapor phase of the refrigerant from the generator and condenses it to liquid form (also known as a condensate). The heat released by the condensation of the vapor is rejected to a cooling tower, cooling water, some other external heat sink, or another stage of the refrigeration apparatus.

The evaporator withdraws heat from a heat load (i.e. the building air, refrigerator contents, cooling water, or other medium the system is designed to cool) by evaporating the condensed liquid refrigerant in direct or indirect contact with the heat load. The evaporator thus revaporizes the volatile refrigerant component.

The absorber contacts the refrigerant vapor component leaving the evaporator with the less-volatile refrigerant component leaving the generator. The contacting process generates heat when the vapor phase is reabsorbed in the less-volatile refrigerant phase. This heat is rejected to a cooling tower, cooling water, another stage of the refrigeration apparatus, or some heat sink. The original composite refrigerant is reformed in the absorber, and then is returned to the generator to complete the cycle.

Triple-effect refrigeration apparatus has two separate but interacting refrigeration circuits of the type described above (sometimes respectively known as a high-temperature loop and a lower temperature loop, as a high loop and a low loop, or as a first loop and a second loop). The first and second loops are interconnected so heat is transferred from the absorber and the condenser of the first loop to the generator of the second loop. Both the first loop and the second loop accept heat from the heat load. The second loop rejects heat from its absorber and its condenser to an external heat sink.

One known generator, which uses steam as a heat source, comprises an outer vessel which is closed at each end and inner vessels which are vertical tubes passing through the outer vessel. Heat supplied to the outer vessel in the form of steam from a source outside the refrigerant loop heats the tubes, and thus the refrigerant within the tubes. The refrigerant is boiled within the tubes, and the vapor and entrained liquid is conveyed upwardly and expelled from the upper ends of the tubes.

An absorber is known in which the less-volatile component of the refrigerant trickles down from coil to coil on the substantially horizontal coils of a heat exchanger as it absorbs the refrigerant vapor leaving the evaporator. The heat exchanger removes the heat resulting from the absorption process. The heat is rejected to a heat sink, such as cooling water.

Certain absorption additives, when present in a refrigerant fluid in the absorber, increase the efficiency of absorption refrigeration systems. These additives function by increasing the rate of absorption of one component of the refrigerant in the other component of the refrigerant.

Generally, these absorption additives are volatile when exposed to the temperatures and pressures such as would be found in the generator, evaporator or condenser of a typical absorption refrigeration system. In addition, they are nearly insoluble in the bulk refrigerant fluid, so that when present in practical concentrations they exist mostly in an immiscible, second liquid phase. In such a system, the additive, although less volatile then the more volatile component (e.g., water in Lithium Bromide—water systems, or ammonia in ammonia water systems) of the refrigerant system, can be separated at relatively low temperatures by steam distillation.

SUMMARY OF THE INVENTION

Accordingly, an object of the present invention is to provide absorption refrigeration apparatus which is more efficient than prior apparatus.

Another object of the present invention is to provide absorption refrigeration apparatus which employs an absorption additive to improve the absorption rate of one refrigerant component in another refrigerant component in the absorber.

An additional object of the present invention is to provide absorption refrigeration apparatus which reduces the exposure of an absorption additive in the refrigerant to harsh conditions in one or more of the components of the apparatus other than the absorber.

Still another object of the present invention is to provide absorption refrigeration apparatus which separates one or more absorption additives from a composite refrigerant at the output of the absorber and recycles the one or more additives to the input of the absorber.

Other objects of the invention will become evident to one of ordinary skill in the art from consideration of the present disclosure.

One aspect of the invention, which satisfies one or more of the above objects, is an absorption refrigeration apparatus comprising an absorber, a generator, a condenser, and an evaporator. These four components are operatively connected to form a refrigerant loop, about which a composite refrigerant and its components circulates. The absorption refrigeration system further comprises a separator located in series between the output of the absorber and the input of the generator for distilling an additive from the composite refrigerant fluid thereby leaving a composite refrigerant fluid which is essentially additive free. The system also has a conduit for recycling the distilled additive from the separator to the input of the absorber.

A related aspect of the invention is a method for operating an absorption refrigeration system. A composite refrigerant fluid and its components are circulated in the absorption refrigeration system. The composite refrigerant fluid has a more-volatile component, a less-volatile component, and a volatile absorption additive. The absorption additive is distilled from the composite refrigerant fluid in a separator, leaving a composite refrigerant fluid (sometimes referred to here as a "dilute refrigerant") which is essentially free of the volatile additive. The essentially additive-free composite refrigerant fluid is then transferred independently to a generator, where it is heated to separate the fluid into a more-volatile component and a less-volatile component. The more-volatile component, the less-volatile component, and the volatile additive are then transferred independently to an absorber where the more-volatile component is absorbed into the less-volatile component in the presence of the absorption additive, reforming the composite refrigerant fluid.

The present invention has several advantages over the prior art. One advantage is that the absorption additive is separated from the composite refrigerant fluid after leaving the absorber, and then recycled back to the absorber while the composite refrigerant fluid is passed through the remaining components of the absorption refrigeration system. Thus, the benefits of the additive are realized in the absorber, but the additive is not exposed to the higher temperature components of the absorption refrigeration system. This is a particularly advantageous feature if the additive is thermally unstable.

Another advantage of the present invention over the prior art is that the volatile refrigerant component circulating in the evaporator and condenser is essentially free of the absorption additive. The additive thus cannot form a separate phase or dilute the efficiency of the volatile refrigerant component in these parts of the apparatus.

BRIEF DESCRIPTION OF THE DRAWINGS

For a more complete understanding of the invention, reference should now be had to the embodiments illustrated in greater detail in the accompanying drawings and described below by way of an example of this invention.

Figure 1:
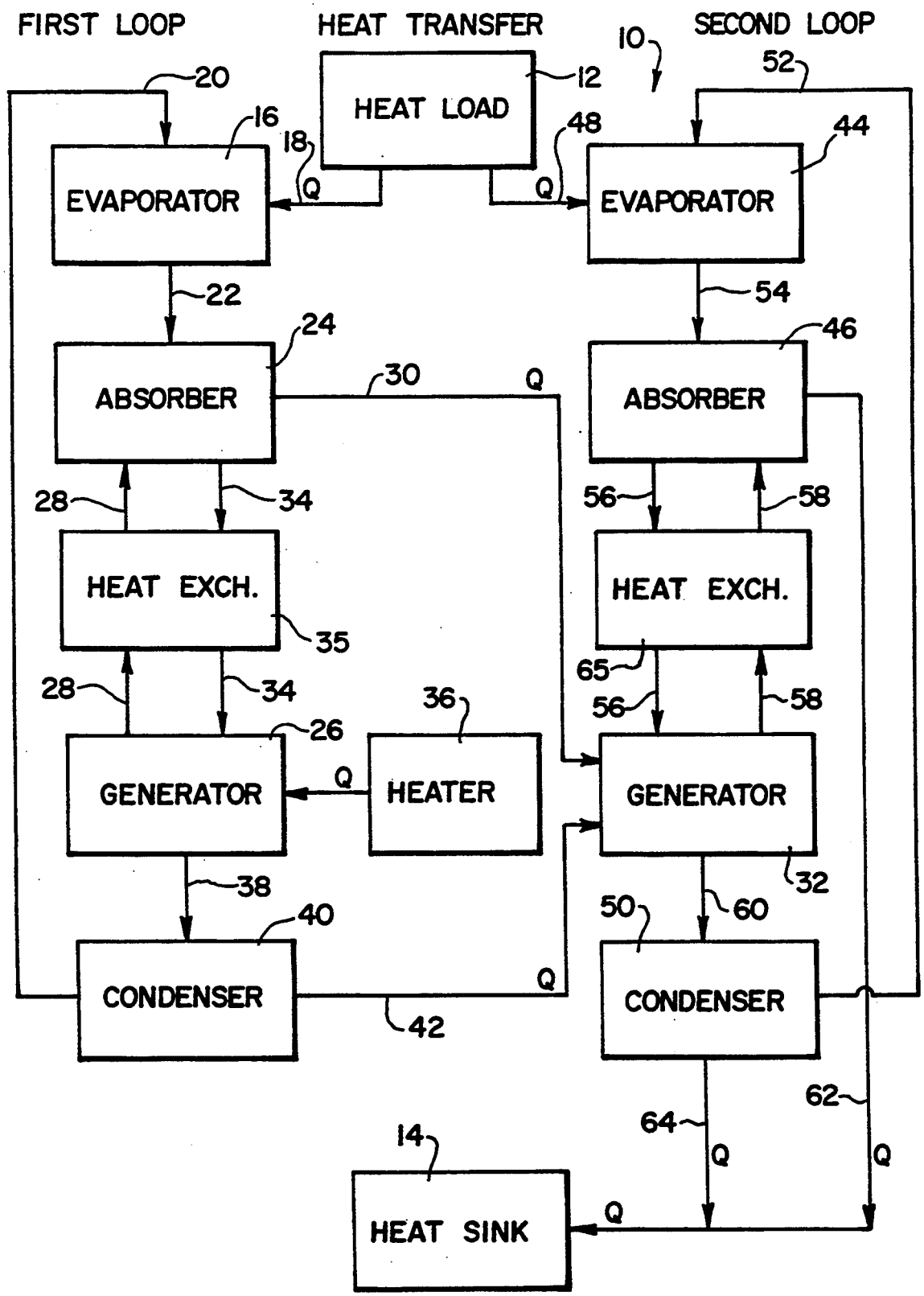
FIG. 1 is a schematic flow diagram of a triple effect absorption refrigeration system, showing an environment in which the invention is useful.

The following reference characters are used in FIGS. 1 through 7:

REFERENCE CHARACTERS

10 ABSORPTION REFRIGERATION SYSTEM
12 HEAT LOAD
14 HEAT SINK
16 FIRST-LOOP EVAPORATOR
18 PATH
20 PATH
22 PATH
24 FIRST-LOOP ABSORBER
26 FIRST-LOOP GENERATOR
28 PATHS
30 PATH
32 SECOND-LOOP GENERATOR
34 PATHS
35 HEAT EXCHANGER
36 HEATER
38 PATH
40 FIRST-LOOP CONDENSER
42 PATH
44 SECOND-LOOP EVAPORATOR
46 SECOND-LOOP ABSORBER
50 SECOND-LOOP CONDENSER
52 VAPOR CONDENSATE LINE
54 REFRIGERANT VAPOR LINE
56 COMPOSITE REFRIGERANT LINES
58 LESS-VOLATILE REFRIGERANT COMPONENT LINES
60 REFRIGERANT VAPOR LINE
62 PATH
64 PATH
66 HEAT EXCHANGER
70 FIRST VESSEL
72 VESSEL
74 LOWER CYLINDRICAL WALL
76 MIDDLE CYLINDRICAL WALL
78 UPPER CYLINDRICAL WALL
80 LOWER BULKHEAD
82 MIDDLE BULKHEAD
84 UPPER BULKHEAD
86 FIRST HEADER
92 SECOND HEADER
94 VERTICAL TUBES
96 INTERIOR SURFACE
98 EXTERIOR SURFACE
100 SUMP
102 REFRIGERAnt RECYCLE PATH
104 SPRAYERS
106 ARRAY OF HEAT-EXCHANGE SURFACES
108 DISTRIBUTOR PLATE
110 INNER SUMP
112 OUTER SUMP
118 SUMP
130 SEPARATOR
132 REFRIGERANT INPUT
134 REFRIGERANT OUTPUT
136 ADDITIVE RECYCLE OUTPUT
138 HEAT INPUT
140 HEAT OUTPUT
142 ABSORBER INPUT
144 LINE
146 LINE
148 LINE
150 SECONDARY FLUID INLET

152 SECONDARY FLUID OUTLET
154 LINE
156 LINE

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

Referring first to FIG. 1, the heat and refrigerant transfers of a triple-effect refrigeration system are illustrated to show the environment in which the present invention operates. The order of the components has been rearranged for clarity. The elements of FIG. 1 are arranged in three columns. The left column relates to the first refrigeration loop; the center column shows the heat sources and the heat sink; and the right column shows the second refrigeration loop.

The system 10 is used to transfer heat from the heat load 12 to the heat sink 14. As is well known, this heat transfer can be carried out whether the heat load 12 is at a higher temperature than, a lower temperature than, or the same temperature as the heat sink 14.

Heat from the load 12 enters the first-loop evaporator 16 of the apparatus via the path 18. (All heat transfers to or from one of the refrigeration loops are represented in FIG. 1 by the letter Q next to an arrow indicating the direction of transfer.) Either the first-loop evaporator 16 is in direct heat-transfer contact with the heat load 12 or heat exchangers connect the first-loop evaporator 16 and the heat load 12 to accomplish this heat transfer.

The heat entering the first-loop evaporator 16 evaporates the condensed refrigerant vapor which has entered the first-loop evaporator 16 via the path 20. The effluent of the first-loop evaporator 16, which traverses the path 22, is refrigerant vapor which bears the heat from the heat load 12.

The first-loop absorber 24 receives the refrigerant vapor via the path 22 and contacts it with the less-volatile liquid refrigerant component received from the first-loop generator 26 via the paths 28. The resulting absorption of the refrigerant vapor into the less-volatile refrigerant liquid both condenses the vapor, releasing its heat of vaporization, and releases heat of dissolution as the result of the absorption process. The resulting heat Q is rejected via the path 30 to the second-loop generator 32. The reconstituted composite refrigerant (including the absorption additive) is passed via the paths 34 to the generator 26.

In the generator 26 of the first loop, the composite refrigerant is heated by the heater 36 sufficiently to distill away the more-volatile refrigerant vapor, leaving the less-volatile constituent of the refrigerant behind. The refrigerant vapor is delivered via the path 38 to the first-loop condenser 40. The less-volatile constituent of the refrigerant goes to the first-loop absorber 24 via paths 28 (as previously described).

In the first-loop condenser 40, the refrigerant vapor entering via the path 38 is condensed. The heat of condensation is rejected from the first loop, and follows the path 42 to the second-loop generator 32. The condensed refrigerant vapor then exits the first-loop condenser 40 via the path 20 and returns to the first-loop evaporator 16 to complete the first-loop cycle.

Thus, in the first loop, heat from the heat load 12 and the heater 36 enters the loop, and heat leaves the loop from the absorber 24 and condenser 40. Apart from any waste heat which is lost, all the heat taken from the heat load 12 and the heater 36 goes to the second-loop generator 32. A heat exchanger 35 is also conventionally provided to transfer heat from the less-volatile refrigerant in the line 28 leaving the generator 26 to the composite refrigerant in the line 34 entering the generator 26.

Referring now to the right side of FIG. 1, the organization of the second refrigerant loop is essentially identical to that of the first refrigerant loop. The primary differences are in the heat inputs and outputs.

The parts of the second loop are a second-loop evaporator 44, a second-loop absorber 46, a second-loop generator 32, and a second-loop condenser 50. These parts are connected in their operative relationship by a refrigerant vapor condensate line 52, a refrigerant vapor line 54, composite refrigerant lines 56, less-volatile refrigerant component lines 58, and a refrigerant vapor line 60. The heat inputs and outputs of the second loop are as follows. The heat required to operate the second-loop generator 32 comes from the first-loop absorber 24 and first-loop condenser 40 via the paths 30 and 42, as previously described. Additional heat from the heat load 12 is received in the second-loop evaporator 44 via the path 48. Heat is rejected from the second-loop absorber 46 and condenser 50 via the paths 62 and 64. Although the paths 62 and 64 are shown as merging, it will be appreciated that separate heat sinks 14 can be provided for the second-loop absorber 46 and the condenser 50. In addition, the reconstituted composite refrigerant is passed via the paths 56 through the heat exchanger 66 to the second-loop generator 32. The heat exchanger 66 preheats the composite refrigerant traversing the paths 56 before it enters the generator 32, using heat which otherwise would escape from the generator 32 via the less-volatile refrigerant lines 58.

Figure 2:
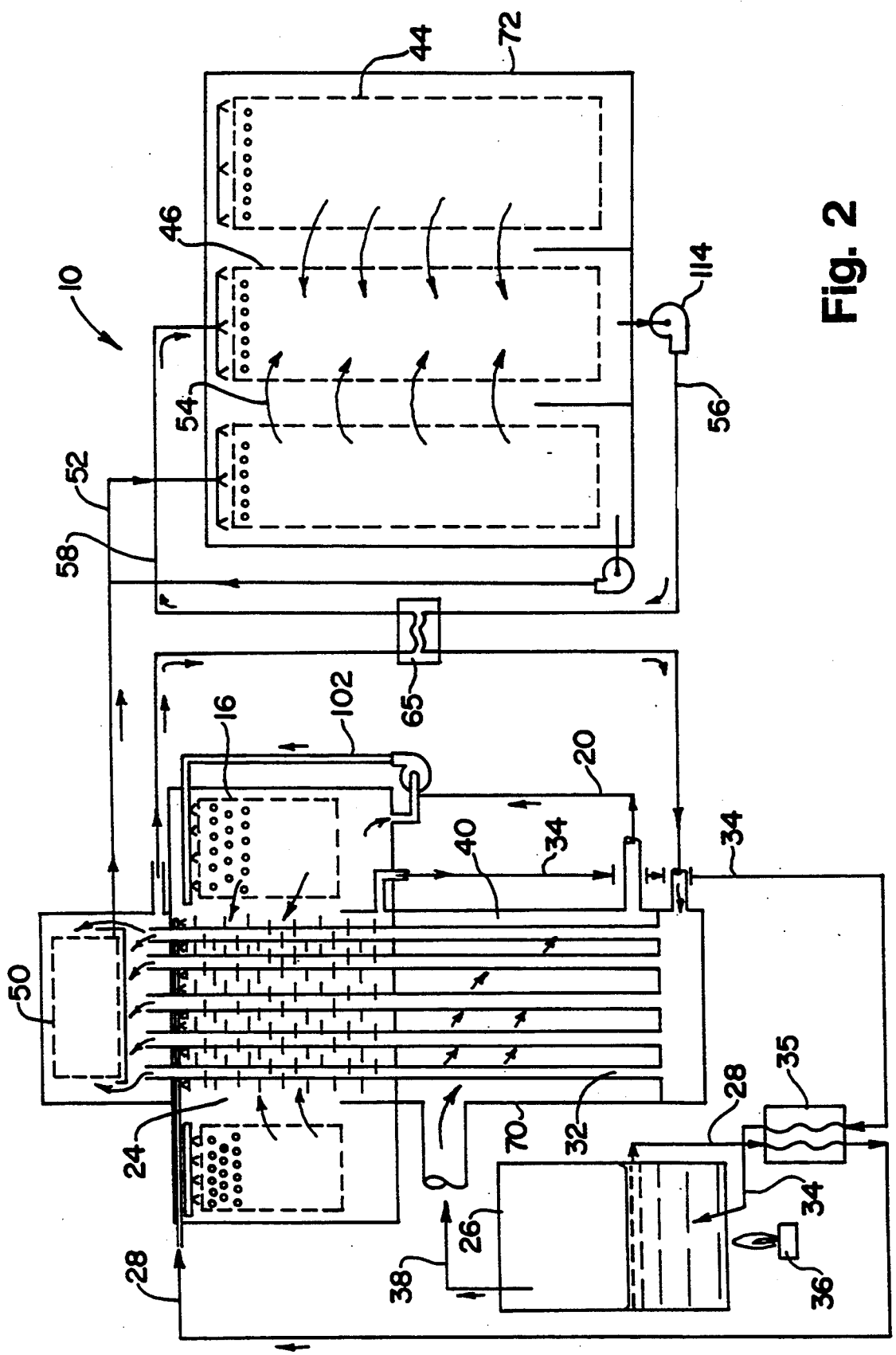
FIG. 2 is a diagrammatic view of the apparatus of FIG. 1.
Figure 3:
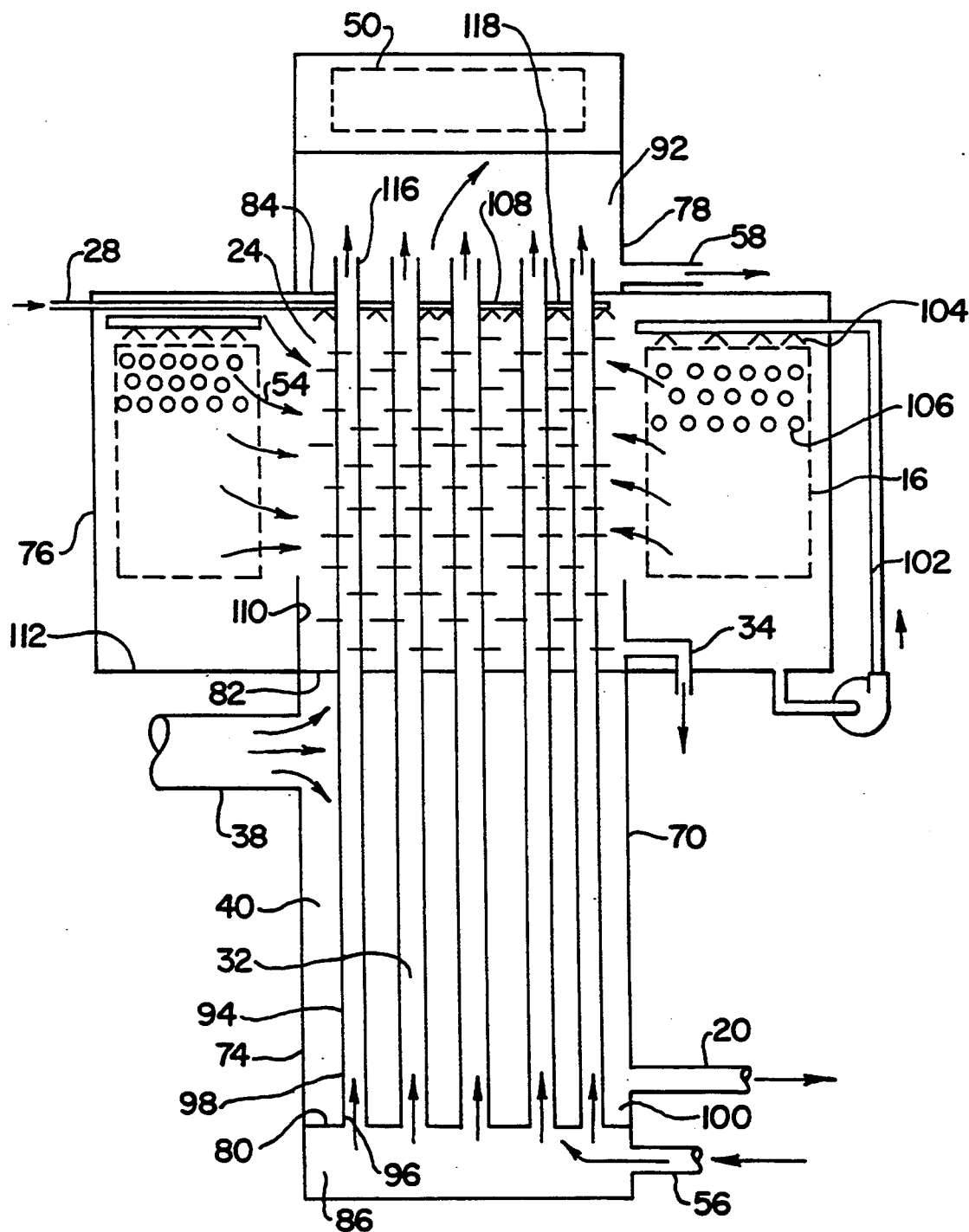
FIG. 3 is a more detailed diagrammatic view of the second-loop generator/first-loop absorber/first-loop condenser vessel illustrated in FIG. 2.

Referring now to FIGS. 2 and 3, apparatus is disclosed which will function as illustrated in FIG. 1. Certain parts of FIGS. 2 and 3 correspond to those of FIG. 1, and thus share identical reference characters.

In the embodiment of FIGS. 2 and 3, the first-loop evaporator 16, the first-loop absorber 24, the first-loop condenser 40, the second-loop generator 32, and the second-loop condenser 50 are all located in a single, subdivided first vessel 70. The first-loop generator 26 is a separate vessel, and the second-loop evaporator 44 and the second-loop absorber 46 are each in a vessel 72. The first-loop generator 26 has not been modified in this embodiment.

Referring now in particular to FIG. 3, the first vessel 70 is made up of a lower cylindrical wall 74, a middle cylindrical wall 76, and an upper cylindrical wall 78. The first vessel defined by the space enclosed by the cylindrical walls 74, 76, and 78 is subdivided by a lower bulkhead 80, a middle bulkhead 82, and an upper bulkhead 84 into a first header or entrance 86, a first-loop condenser (also known herein as a second vessel) 40, a first-loop absorber chamber (also known herein as a third vessel) 24, and a second header or exit 92 arranged in series. The bulkheads 80, 82, and 84 are sealed to the cylindrical walls 74, 76, and 78 to close the first vessel and provide fluid-tight partitions.

A multiplicity of substantially vertical tubes such as 94, each having a cylindrical wall defining an interior surface 96 and an exterior surface 98, provides communication between the first header 86 and the second header 92. These tubes 94 pass through the first-loop condenser (also known as a second vessel) 40 and the first-loop absorber (also known as a third vessel) 24. The bulkheads 80, 82, and 84 also are welded, soldered, or otherwise sealed about the exterior surfaces 98 of the tubes 94 to maintain fluid-tight partitions between the first header 86, the first-loop condenser 40, the first-loop absorber 24, and the second header 92.

The walls of the tubes 94, taken together, define a partition between the first conduit (which is outside the walls of the tubes 94 in the vessel 70 between the bulkheads 80 and 84) and the second conduit (which is the sum of all the spaces within the walls of the tubes 94 in the vessel 70 between the bulkheads 80 and 84). The walls of the tubes 94 serve as a heat transfer media between the first and second conduits. The walls of the tubes 94 are made of a copper alloy or another material which is structurally sound, not readily corroded, essentially liquid and vapor tight, and a good conductor of heat.

More specifically, the space above the lower bulkhead 80, below the middle bulkhead 82, outside the tubes 94, and within the lower cylindrical wall 74 is the first-loop condenser (second vessel) 40. The spaces enclosed by the interior surfaces 96 of the tubes 94 and located within the confines of the first-loop condenser 40 collectively define a first stage of the second-loop generator 32. The portions of the walls of the tubes 94 enclosed within the first-loop condenser 40 define the heat transfer path 42 of FIG. 1.

Above the middle bulkhead 82, below the upper bulkhead 84, outside the tubes 94, and within the middle cylindrical wall 76 is the first-loop absorber or third vessel 24. The spaces enclosed by the interior surfaces 96 of the tubes 94 within the confines of the first-loop absorber 24 collectively define a second stage of the second-loop generator 32. The portions of the walls of the tubes 94 enclosed within the first-loop absorber 24 define the heat transfer path 30 of FIG. 1.

The first-loop condenser 40 has an entrance generally indicated at 38 for receiving refrigerant vapor. The vapor condenses on the exterior surfaces 98 of the tubes 94. The droplets of refrigerant condensate formed on the surfaces 98 run down the tubes 94, due to the influence of gravity, forming a pool of the condensate in the sump 100 at the bottom of the first-loop condenser 40. The condensate is drained via the refrigerant path 20 to the first-loop evaporator 16. In this embodiment, the path 20 merges into the refrigerant recycle path 102.

Since the surfaces 98 of the tubes 94 present a large surface area providing many sites for condensation, the heat of condensation from the condensing refrigerant vapor in the first-loop condenser 40 is mostly transferred to the tubes 94, and heats the contents of the tubes 94. The condenser 40 thus provides its heat to the contents of the tubes 94.

The first-loop evaporator 16 preferably is an annular assembly located within the boundaries of the cylindrical wall 76 and surrounding the first-loop absorber 24. The condensed refrigerant vapor is delivered to the evaporator 16 from the sump 100 via the line 20 and the refrigerant recycle path 102. The condensate is sprayed through the sprayers 104 over an array of heat-exchange surfaces generally indicated at 106 which make up the first-loop evaporator 16. Water to be chilled (representing the heat load 12 of FIG. 1) or a separate heat exchange fluid is passed through the array 106 to transmit heat from the heat load 12 to the refrigerant vapor condensate. The heat thus accepted revaporizes the refrigerant condensate. The vapor produced in the first-loop evaporator 16 fills the interior of the first-loop absorber 24, and is in contact with the surfaces 98 of the tubes 94 between the bulkheads 82 and 84.

While the refrigerant vapor is in contact with the surfaces 98, the low-volatility component of the refrigerant is delivered to the first-loop absorber 24 via the line 28. The low-volatility refrigerant component is conveyed to the top surface of the distributor plate 108. The distributor plate 108 deposits the low-volatility refrigerant component onto the exterior surfaces 98 of the tubes 94. Gravity causes sheets or drops of the less-volatile component of the refrigerant to flow down the exterior surfaces 98.

As this low-volatility refrigerant component flows down the exterior walls 98, the heat already in the low-volatility refrigerant component (which has just been boiled in the first-loop generator 26 to release the volatile component) is transferred to the tubes 94, and thus to their contents. At the same time, the refrigerant vapor generated by the first-loop evaporator 16 is absorbed by the less-volatile refrigerant component flowing down the tubes 94, reforming the original composite refrigerant and releasing a substantial quantity of heat of absorption and condensation. This heat is taken up by the tubes 94, and thus their contents.

The newly-reconstituted composite refrigerant flows down the tubes 94 to the middle bulkhead 82 and collects in the inner sump 110. The contents of the inner sump 110 are drained by the line 34 and returned to the first-loop generator 26 via the heat exchanger 35. The first-loop evaporator 16 also has an outer sump 112 in which the liquid sprayed onto the array of heat-exchange surfaces 106 of the first-stage evaporator 16, and which fails to evaporate, collects. The liquid refrigerant in the outer sump 112 is recycled via the refrigerant recycle path 102 to the sprayers 104.

Referring to FIG. 3, and occasionally to FIGS. 1 and 2, the second-loop generator 32 of the illustrated embodiment will now be discussed. The composite liquid second-loop refrigerant (which may be the same as or different from the first-loop refrigerant) enters the first header 86 of the second-loop generator 32 via the line 56.

In the first stage of the second-loop generator 32 (within the first-loop condenser 40), the composite refrigerant leaving the second-loop absorber 46 is pumped by the pump 114 (FIG. 2) into the first header 86 and up into the entrances of the tubes 94. Heat is transferred to the composite second-loop refrigerant disposed within the interior surfaces 96 of the tubes 94 from the first-loop refrigerant vapor condensing on the exterior surfaces 98 of the same tubes 94. Due to a combination of convection and the buoyancy of the refrigerant vapor bubbles formed in the tubes 94, the charge of second-loop composite refrigerant is driven upward within the tubes 94. The vapor bubbles rise particularly rapidly within the tubes 94.

Absorption is taking place on the exterior surfaces 98 of the tubes 94 within the first-stage absorber 24, which encloses the second stage of the second-loop generator 32. The second-loop refrigerant within the interior surfaces 96 of the tubes 94 is further heated by the first-loop absorption taking place adjacent to the exterior surfaces 98 of the same tubes. This heating distills more refrigerant vapor from the less-volatile constituent of the second-loop refrigerant within the tubes 94. The rising bubbles of vapor formed within the interior surfaces 96 expel both themselves and the entrained less-volatile liquid refrigerant through the tops 116 of the tubes 94 and into the second header 92.

Referring now to FIGS. 2 and 3 together, the vapor component of the second-loop refrigerant leaving the tubes 94 is captured by the headspace in the second header 92. The less-volatile liquid constituent of the second-loop refrigerant expelled from the same tubes 94 is deflected to and collects in a sump 118 defined by the top of the upper bulkhead 84. From the sump 118, the less-volatile second-loop refrigerant component is conveyed by the line 58 to the second-loop absorber 46.

In this embodiment, the second-loop condenser 50 is also located within the second header 92. The second-loop condenser 50 throws off heat to the heat sink 14 (FIG. 1), then collects the condensed second-loop refrigerant vapor for transport to the second-loop evaporator 44 via the line 52.

Several distinguishing features of the illustrated apparatus are these. The tubes 94, in aggregate, have a large wall area, providing a high degree of heat exchange between the interior surfaces 96 and exterior surfaces 98 of the tubes 94. Direct heat exchange thus occurs between the first-loop condenser 40 and the second-loop generator 32, as well as between the first-loop absorber 24 and the second-loop generator 32. This provides much more efficient heat exchange than is found when heat is transferred indirectly via a coupling loop with an intermediate fluid, as has been suggested in earlier systems.

Another distinction is that, because the prevailing flow of the condensing vapor within the first-loop condenser 40 is downward, and the flow of the refrigerant within the second-loop generator 26 via the tubes 94 is generally upward, the hottest part of the first-loop condenser contacts the hottest part of the second-loop generator 32, and the coolest fraction of the refrigerant outside the tubes 94 contacts the coolest fraction of the refrigerant within the tubes 94. This counterflow provides for efficient heat transfer.

Still further, the condenser space in this apparatus is outside the tubes 94, as has been the case in prior systems, but unlike prior systems, the second-loop generator space is inside those tubes.

Now addressing the first-loop absorber 24, one difference is that the absorbing process takes place on the exterior surfaces 98 of the tubes 94, while the second-loop generator 32 is located within the very same tubes 94. The walls of the tubes 94 are all that separates the absorber 24 and the generator 32. This arrangement eliminates the need for a separate heat exchange loop in which a separate heat-exchange fluid is circulated between two heat exchangers, the walls of which respectively define second and third heat-exchange media in the second-loop generator 32 and the first-loop absorber 24.

The present system thus provides a direct heat-exchange relation (i.e. a single heat exchange media) between the first-loop absorber 24 and the second-loop generator 32, and between the first-loop condenser 40 and the second-loop generator 32. This eliminates both a media (tube wall) and medium (heat exchange fluid), as well as the means for circulating the medium.

Another distinctive feature of the present apparatus is the flow of the less volatile refrigerant for absorption along the outside of the tubes 94, which are substantially straight and normally vertical ("normally" referring to the orientation of the apparatus in use). The refrigerant flows down the exterior surfaces 98 of the tubes 94 in a very thin, large surface area sheet which provides a large contact area between the less-volatile liquid phase and the vapor phase of the refrigerant. These tubes can have external and/or internal enhancements to provide for greater heat exchange surface area at relatively low cost.

The liquid flowing down the exterior walls 98 and the contents rising within the interior walls 96 of the tubes 94 are in counter-current flow. Heat transfer is thus most efficient.

The vessel 72 containing the second-loop evaporator 44 and the second-loop absorber 46 is somewhat similar to the corresponding apparatus of the first loop. The second-loop evaporator 44 can be annular and can contain the second-loop absorber 46 within it so the refrigerant vapor from the second-loop evaporator 44 is released within the second-loop absorber 46. The illustrated apparatus shows a conventional second-loop absorber 46 with sprayers to subdivide the less volatile liquid refrigerant component.

The combined first-loop absorber 24 and second loop generator 32 could be provided in a different vessel than the combined first-loop condenser 40 and second-loop generator 32. Also, depending upon the refrigerant/absorbent combination employed, the first loop absorber 24 and first loop condenser 40 could be vertically interchanged and the second loop generator 32 left unchanged.

The respective condensing and absorbing operations taking place outside the exterior walls 98 of the tubes 94 could be reversed. Three or more interconnected refrigerant loops could also be employed, within the scope of the present invention. Still further, a supplemental source of heat can be used to heat the first header 86, and thus the refrigerant within it.

Figure 4:
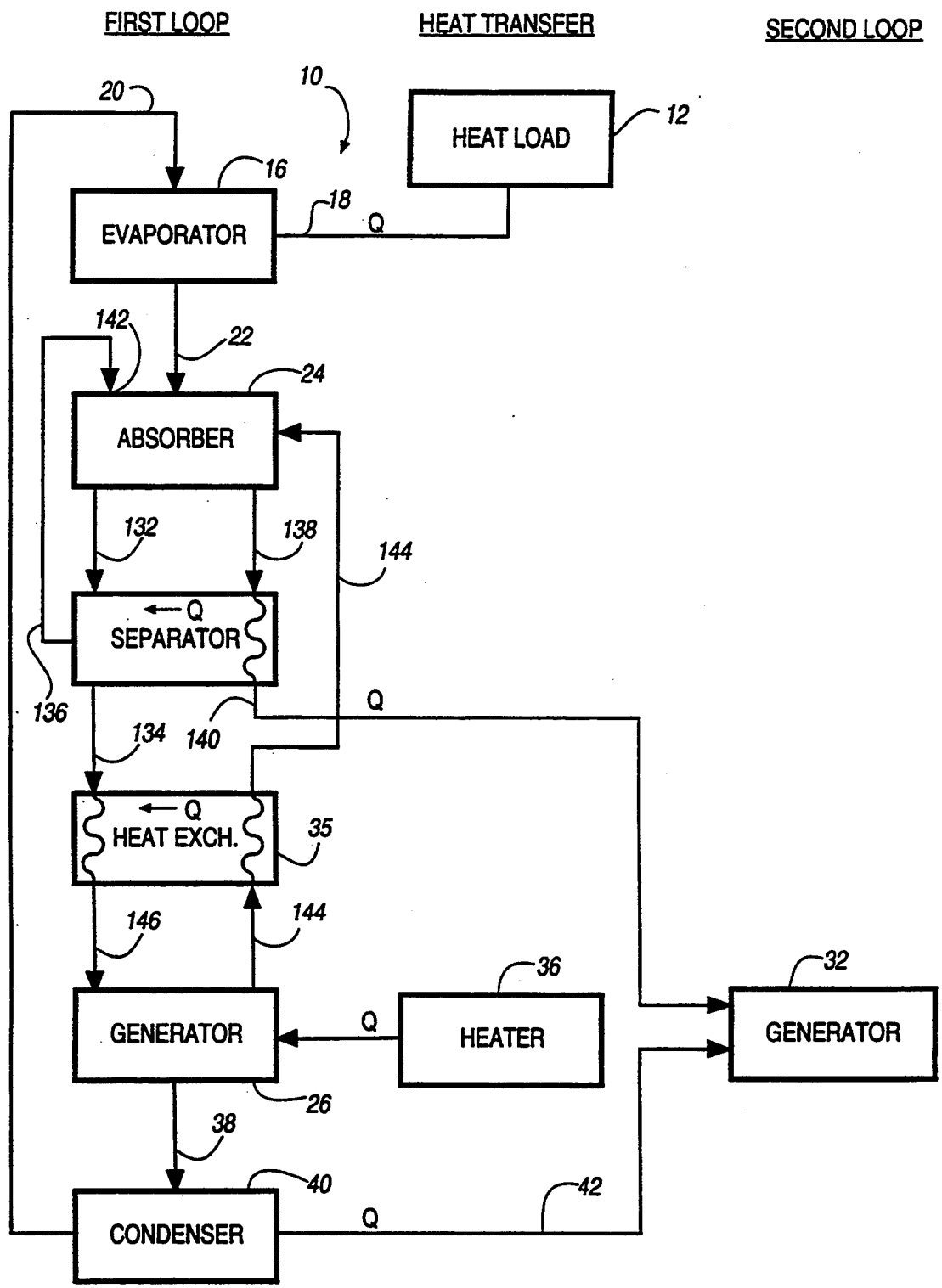
FIG. 4 is a schematic flow diagram of one embodiment of an absorption refrigeration system according to the present invention.
Figure 5:
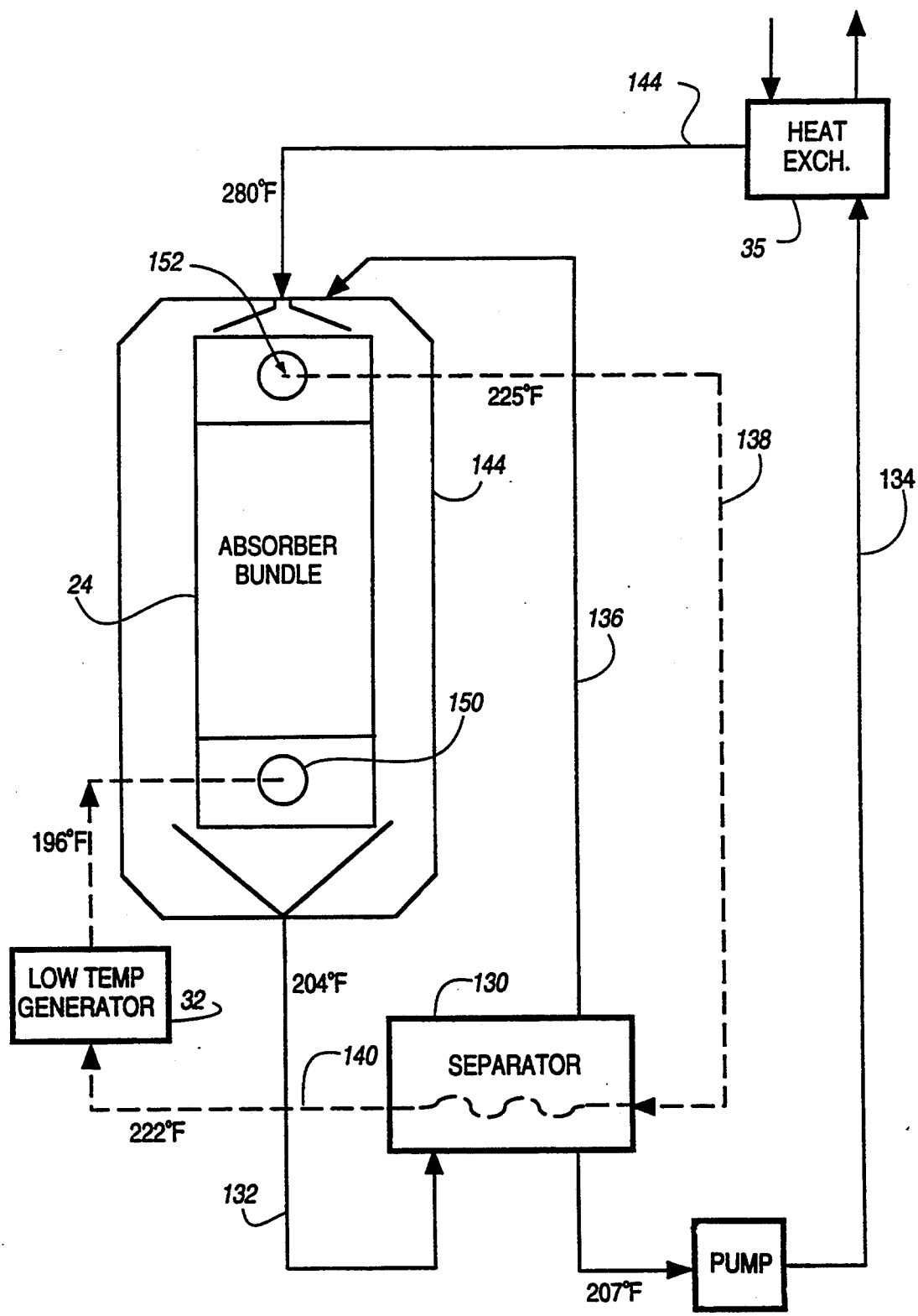
FIG. 5 is a diagrammatic view of the embodiment illustrated in FIG. 4.

Referring now to FIGS. 4 and 5, one embodiment of the absorption refrigeration system 10 according to the present invention is illustrated. Most of the parts of the embodiment of FIGS. 4 and 5 correspond to those of FIG. 1 and thus share identical reference numbers.

As in FIG. 1, the first loop of the system 10 shown in FIG. 4 includes a first-loop evaporator 16, a first-loop absorber 24, a first-loop generator 26, and a first-loop condenser 40 operatively connected to form a closed refrigerant loop. In the embodiment shown in FIG. 4, the first loop also includes a separator 130 interposed in series between the first-loop absorber 24 and the first-loop generator 26, such that the first-loop evaporator 16, the first-loop absorber 24, the separator 130, the first-loop generator 26, and the first-loop condenser 40 are operatively connected to form a closed refrigerant loop.

The working fluid used in the embodiment of FIG. 5 is referred to in this specification and the claims as a dilute refrigerant fluid or composite refrigerant fluid. The composite refrigerant fluid is made up of a less-volatile component, a more-volatile component, and an absorption enhancing additive to circulate throughout the first loop. A variety of absorption enhancing additives can be used in the present systems. Examples of absorption additives for use in the present invention include: 2 ethyl-1-hexanol and several other octyl alcohol isomers; 1-heptanol, and 2-heptanol and other isomers of heptyl alcohol; 1-hexanol and 1-nonanol and several hexanol and nonanol isomers; various amines with the same carbon chain structures as the above indicated alcohols; certain fluorinated alcohols as disclosed in U.S. Pat. No. 3,783,631 including 1H, 1H, 7H—Dodecafluoro-1-Heptanol and 1,1,1,-Trifluoro-2-octanol.

The separator 130 of this embodiment has a refrigerant input line 132, a refrigerant output 134, an additive recycle output line 136, a heat input line 138, and a heat output line 140. The refrigerant input line 132 receives the dilute or composite refrigerant from the output of the absorber 24. The heat input line 138 receives heat from an external source, here by receiving, a heat-exchange fluid, which transfers heat from the heat output Q of the absorber 24. The heat exchange fluid, depleted of some of its heat, is directed by the heat output line 140 to a heat sink, here the generator 32 of a second loop.

Within the separator 130, the dilute refrigerant is put into heat exchange relation with the heat exchange fluid, thus heating the dilute refrigerant fluid. Heating the dilute refrigerant fluid distills from it the additive by steam distillation, leaving an essentially additive-free dilute refrigerant behind.

The additive is recycled via the additive recycle output line 136 to the input 142 of the absorber 24. Before or within the absorber 24, the additive vapor from the additive recycle output line 136 is combined with the volatile refrigerant leaving the evaporator 16 via the line 22 and the non-volatile refrigerant, passed from the generator 26, by line 144.

The additive-free dilute refrigerant left in the separator 130 after the distillation leaves the separator via the refrigerant output line 134 and enters the generator 26, where it is heated conventionally to continue the refrigeration cycle conventionally.

The separator 130 of this embodiment is essentially distillation apparatus which removes the additive at the output of the absorber 24 and recycles it to directly to the input of the absorber 24, bypassing the heat exchanger 35, the generator 26, the condenser 40, and the evaporator 16. As a result, the refrigerant in the absorber contains an effective amount of the additive to improve the efficiency of the absorber, while the refrigerant components in the rest of the system are essentially free of the additive.

The refrigerant composition and the conditions in the separator 130 which are necessary to accomplish this result will be readily determinable by one of ordinary skill in the art who has reviewed the present disclosure. One example of conditions contemplated herein is the following:

The composition of the dilute solution entering the separator 130 is:
0.05 pbw (parts by weight) 2-ethylhexanol
19.95 pbw water (more volatile component of absorption refrigerant)
51.00 pbw $ZnBr_2$
29.00 pbw LiBr (less-volatile component of absorption refrigerant)

The composition of the dilute solution leaving the separator 130 via the conduit 134 is:
0.001 pbw 2-ethylhexanol
19.90 pbw water
51.00 pbw $ZnBr_2$
29.00 pbw LiBr The composition of the refrigerant vapor returned to the absorber via the additive recycle output 136 is:
0.049 pbw 2-ethylhexanol
0.050 pbw water The dilute solution enters the separator 130 at 204° F. after being heated by the water loop entering at 225° F. and leaving at 222° F.

As shown in FIG. 5 the heat exchange fluid in this embodiment is passed from the second loop 10 of the system to the first loop absorber 24. The first loop absorber 24 also has a secondary fluid inlet 150 and a secondary fluid outlet 152. The heat exchange fluid enters the secondary fluid inlet 150 where it accepts heat which was rejected during absorption process in the first loop absorber 24. The heat enriched fluid passes through the secondary fluid outlet 152 and is passed to the separator 130 by line 138. The heat enriched fluid transfers heat to the composite refrigerant fluid, carried to the separator 130 by the refrigerant input line 132, to distill the absorption additive from the composite refrigerant fluid. The heat exchange fluid then transfers the remaining heat to the second loop generator 32. In the embodiment in FIG. 5 the temperature of the heat exchange fluid passed through the secondary fluid inlet 150 is about 196° F., the temperature of the fluid passing through the secondary fluid outlet 152 is about 222° F. and the heat transfer to the second loop generator 32 occurs at about 204° F.

Figure 6:
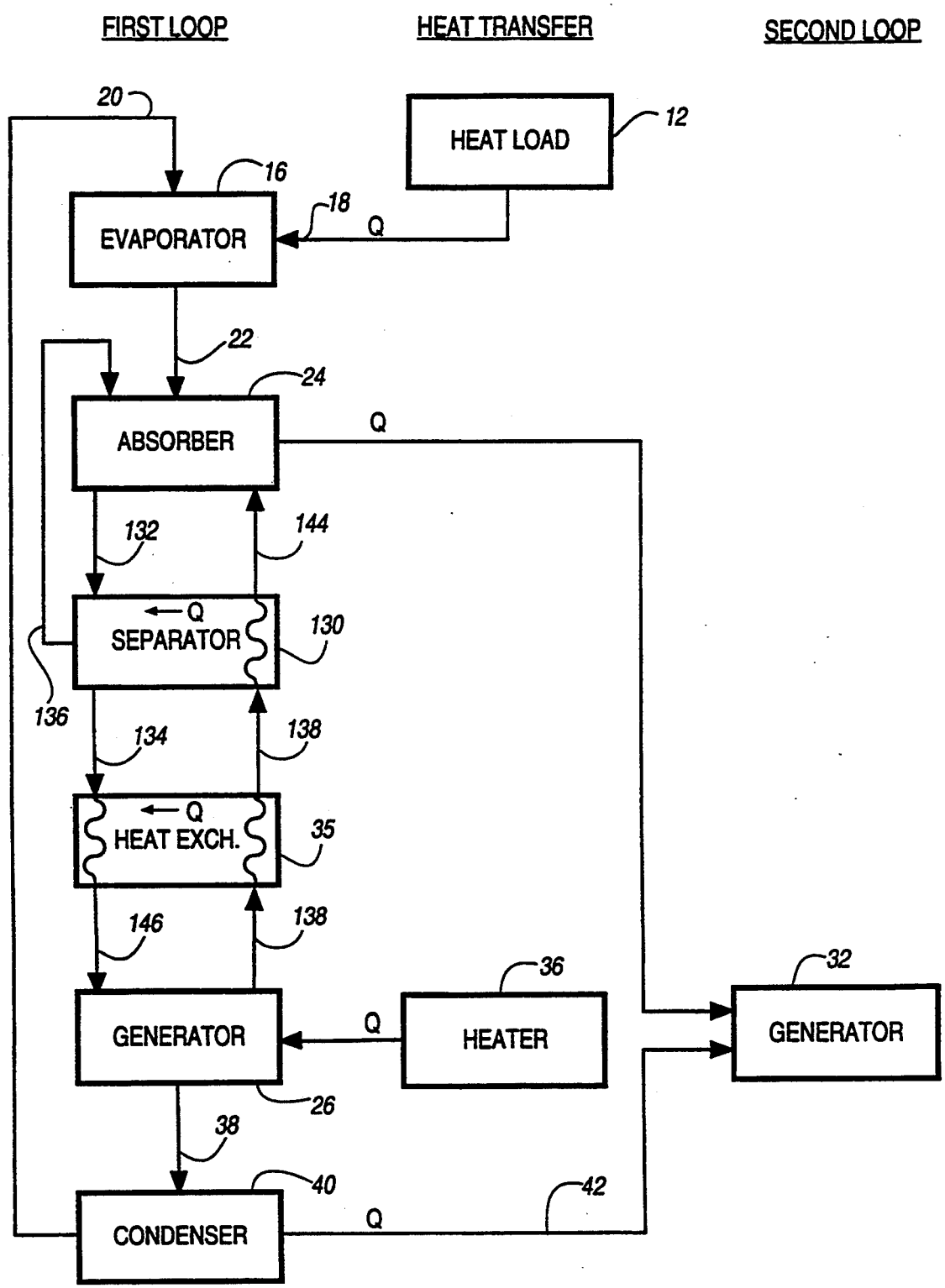
FIG. 6 is a schematic flow diagram of another embodiment of a absorption refrigeration system according to the present invention.
Figure 7:
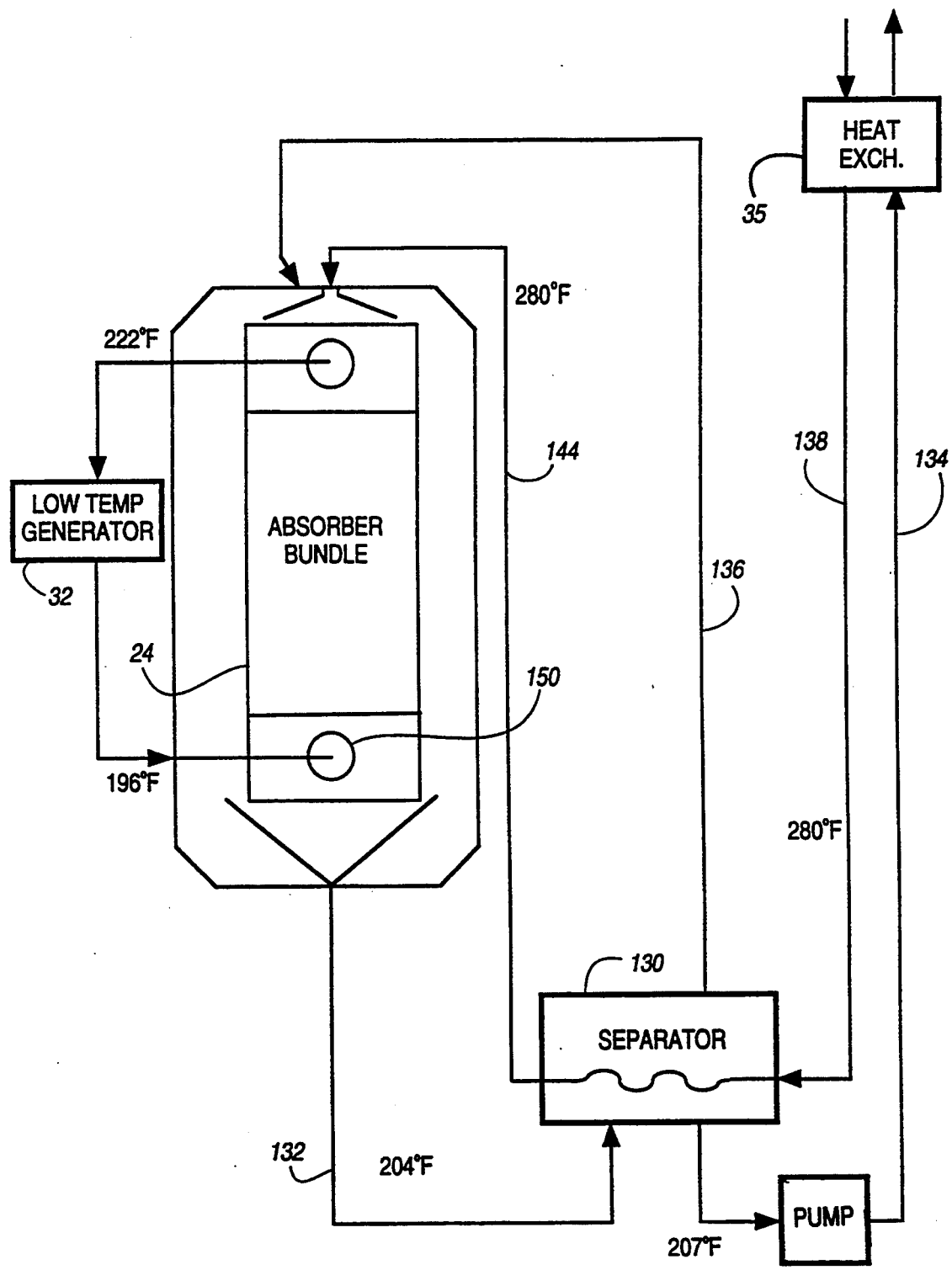
FIG. 7 is a diagrammatic view of the embodiment illustrated in FIG. 6.

The embodiment of FIGS. 6 and 7 is essentially the same as that of FIGS. 4 and 5, except that the source of heat in the embodiment of FIGS. 6 and 7 is different. The heat exchange fluid here is the non-volatile refrigerant component. As in FIG. 3 and 4 the non-volatile component is separated from the volatile component in the first loop generator 26. The non-volatile component is passed through the separator 130, from the generator by line 156. In the separator 130, the non-volatile component transfers heat to the composite refrigerant solution, to distill any absorption addition from the composite refrigerant solution. The non-volatile refrigerant leaving the evaporator 16, via the line 22, in the presence of additive vapor transferred from the additive recycle output line 136. The resulting heat generated during the absorption process is rejected to the second-loop generator 32. In other respects, the first and second embodiments are identical.

In the embodiment in FIG. 7 the temperature of the non-volatile fluid passed to the separator 130 is about 280° F. The resulting fluid passed to the absorber 24 is about 250° F. While the composite refrigerant fluid passed to the refrigerant input line 132 is about 204° F.

Many different embodiments of the present invention are contemplated. For example, the heat to operate the separator 130 may come from a combination of sources within the apparatus, or different sources than those described in connection with the previously-described embodiments. A flame or other external source of heat may also be used in the separator 130, as may electric heat. Instead of or in addition to heating the separator 130, the pressure within it may be reduced to cause or facilitate the distillation of its contents.

Other means for separating the dilute refrigerant and the additive are also contemplated. These means may include extraction, centrifugal separating, and settling. These separation means are all old and well known by those skilled in the art.

Where the additive may be tolerated in small quantities in the rest of the apparatus but not at a higher concentration which is desirable for the absorber, the separator may be used merely to deplete the concentration of the additive, instead of essentially exhausting it, and the refrigerant containing an acceptably depleted concentration of the additive for circulation throughout the refrigerant loop shall be defined for the present purposes as being "essentially free" of the additive.

Similarly, the volatile component of the refrigerant can be separated to some degree with the additive in the separator, and carried with the additive back to the absorber without departing from the scope of the invention. This is particularly contemplated if the additive and one or more components of the refrigerant form an azeotrope.

These and other variations and improvements of the presently disclosed embodiment are also contemplated within the full scope of the present invention.

What is claimed is:

1. An absorption refrigeration system comprising:
   an absorber having an input and an output, a generator having an input, a condenser, and an evaporator, operatively connected to define a closed refrigerant path;
   a separator interposed in series in said refrigerant path between the output of said absorber and the input of said generator for distilling an additive from a composite refrigerant fluid, thereby leaving an additive-depleted composite refrigerant fluid; and
   a conduit for recirculating an additive from said separator to the input of said absorber.

2. The absorption refrigeration system of claim 1, wherein said additive is selected from the group consisting of 2-ethyl-1-hexanol, 1-heptanol, 2-heptanol, 1-hexanol, 1-nanonal, 1H, 1H, 7H -Dodecafluoro-1-heptanol, and 1,1,1, - Trifluoro-2-octanol.

3. The absorption refrigeration system of claim 1, wherein said closed refrigerant path defines a high temperature loop of a dual-loop triple effect refrigeration apparatus, said apparatus further comprising a second condenser, a second evaporator, a second generator, and a second absorber, operatively connected to define a low-temperature loop of said dual loop triple effect refrigeration apparatus.

4. The absorption refrigeration system of claim 1, wherein said separator comprises a heater adapted to distill said additive from said composite refrigerant fluid by heating said composite refrigerant fluid.

5. The absorption refrigeration system of claim 1, further comprising apparatus for transferring heat from said absorber to said composite refrigerant fluid in said separator to distill said additive from said composite refrigerant fluid.

6. The absorption refrigeration system of claim 1, wherein said closed refrigerant path defines a low-temperature loop of a dual-loop triple effect refrigeration apparatus, said apparatus further comprising a second generator, a second condenser, a second evaporator, and a second absorber operatively connected to define a high-temperature loop of said dual-loop triple effect refrigeration apparatus.

7. The absorption refrigeration system of claim 1, wherein said generator comprises apparatus for heating said additive-depleted composite refrigerant fluid sufficiently to separate said additive-depleted composite refrigerant fluid into a less-volatile component and a more-volatile component.

8. The absorption refrigeration system of claim 1, wherein at least one of said generator, said condenser, and said evaporator is adapted to operate under conditions at which said additive is thermally unstable.

9. A method of operating an absorption refrigeration system comprising the steps of:
   providing a composite refrigerant fluid comprising a less- volatile component, a more-volatile component, and an absorption additive;
   distilling said absorption additive from said composite refrigerant fluid, thereby removing an additive distillate and leaving an essentially additive-free composite refrigerant fluid;
   separating said essentially additive-free composite refrigerant fluid into said less-volatile component and said more-volatile component; and
   absorbing said more-volatile component in said less-volatile component in the presence of said additive distillate, thereby re-forming said composite refrigerant fluid.

10. The method of claim 9, further comprising the steps, between said absorbing step and said separating step, of
   condensing said more-volatile component; and
   evaporating said more-volatile component in the presence of a heat load.

11. The method of claim 9, further comprising the step of transferring heat from said less-volatile component to said composite refrigerant fluid to carry out said distilling step.

12. The method of claim 9 further comprising the step of transferring heat from said absorber to said composite refrigerant fluid to carry out said distilling step.

13. The method of claim 9, wherein said distillation is carried out by providing a hot fluid and placing said hot fluid in heat exchange relation with said composite refrigerant fluid.

14. The method of claim 9, wherein said distilling step is carried out before at least one of said separating, condensing, and evaporating steps.

* * * * *